Figure 1:
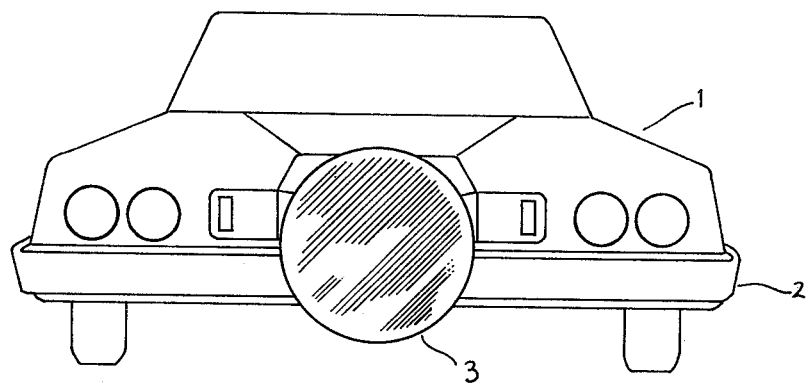

United States Patent [19]

Eshelman

[11] 4,002,364
[45] Jan. 11, 1977

[54] BACK MOTION TIRE BUFFER

[76] Inventor: Cheston Lee Eshelman, 621 NE. 30 Terrace, Miami, Fla. 33137

[22] Filed: Nov. 13, 1975

[21] Appl. No.: 631,630

[52] U.S. Cl. .............................. 293/67; 224/42.06
[51] Int. Cl.² ........................................ B60R 19/10
[58] Field of Search ............ 293/19, 25, 26, 64–67, 293/71 R, 71 P, 99, 84, 85, 89, 97, 98, 69, 71; 224/42.03, 42.04, 42.05, 42.06

[56] References Cited

UNITED STATES PATENTS

| | | | |
|---|---|---|---|
| 1,599,559 | 9/1926 | Dunston | 224/42.06 |
| 1,599,565 | 9/1926 | Girl | 224/42.06 |
| 2,173,642 | 9/1939 | Fageol | 293/67 |
| 2,257,495 | 9/1941 | Fageol | 293/67 |
| 3,482,749 | 12/1969 | Cooper | 224/42.06 |
| 3,603,633 | 9/1971 | Eshelman | 293/69 R |
| 3,841,683 | 10/1974 | Toro | 293/71 P X |
| 3,894,668 | 7/1975 | Chapman et al. | 224/42.06 |

*Primary Examiner*—Stanley H. Tollberg
*Assistant Examiner*—Norman L. Stack, Jr.

[57] ABSTRACT

In a highway type motor vehicle, a vehicle wheel and wheel mounted pneumatic tire positioned in the front or rear of the vehicle, with the wheel and tire substantially vertical to the highway surface, with the bottom tread of the tire about the height of the ground clearance of the vehicle frame, having means for supporting the approximate center of the rear portion of said tire and wheel securely to a hub flange attached to a vertical arm which is attached to a sliding sleeve on a longitudinal strut with the rear of the strut attached to the axle cross member frame of the vehicle and the front sleeve attached to the movable bumper rail, or as an alternative, means for attaching the vertical arm to the movable bumper rail, eliminating the longitudinal strut and sliding sleeve, so that the exposed tire and wheel will act as a Back Motion Tire Buffer as the wheel, tire and bumper move back against the stop in the cylinders on the vehicle to which it is installed without touching the body together all as one unit upon collision, into an obstruction, decelerating the vehicle, dissipating the energy of motion into the wheel, tire and movable back motion stroke of the bumper, preventing override and underride of struck bumpers, instead of destruction of the sheet metal and injury or death to its occupants.

6 Claims, 9 Drawing Figures

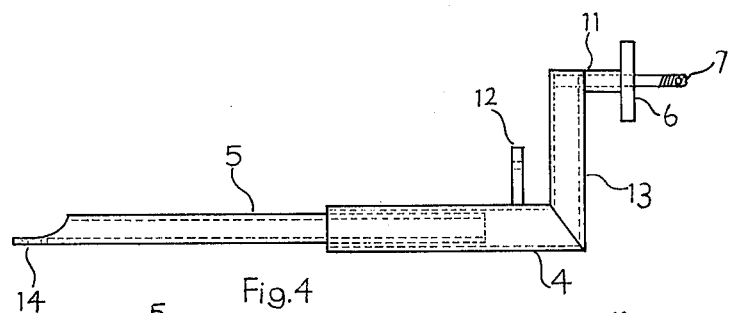
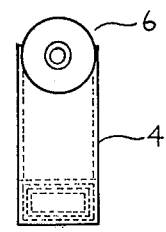
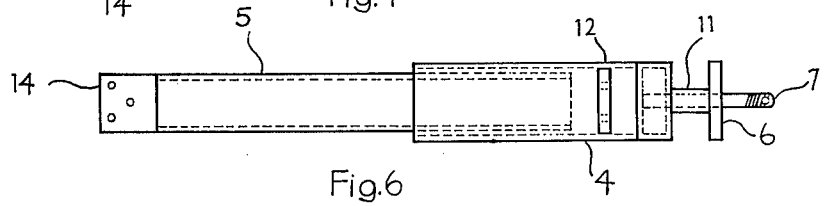
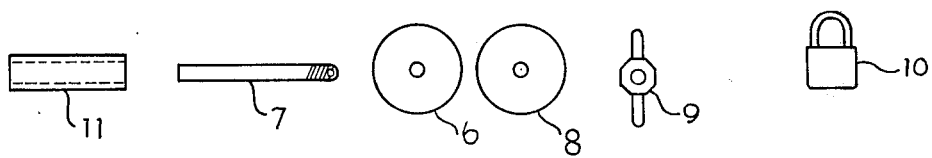
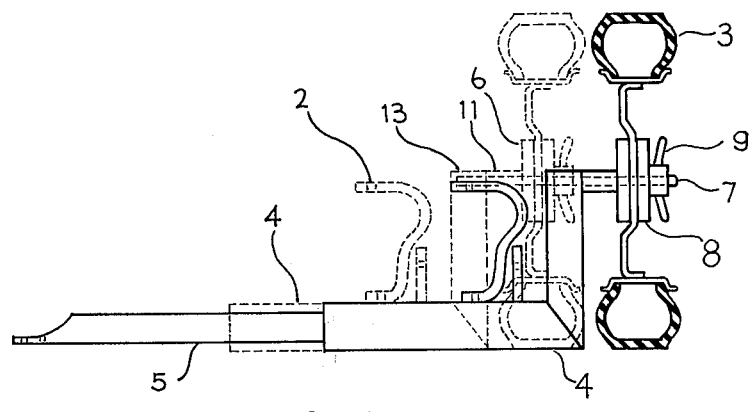
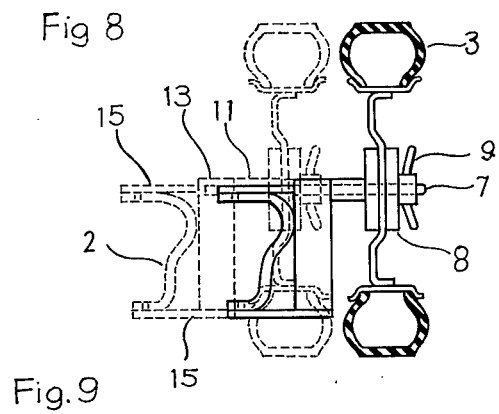

BACK MOTION TIRE BUFFER

DESCRIPTION

My invention relates to an improvement in a Back Motion Tire Buffer for a highway vehicle using a pneumatic tire and wheel, mounted to the front or rear of the vehicle so that it will operate to absorb the energy of a collision, to offer "crash-worthiness" and to help protect the occupants from death or injury and help prevent the vechicle from unnecessary damage in a collision.

With the ever-increasing use of express highways and the high cruising speed of modern automobiles plus the increased number of vehicles on the roads, there is a steady increase in traffic collisions with many deaths and serious injuries due to high speed collision with a barrier or headon collision into an oncoming vechicle. One can hardly read a newspaper or watch the news on television without seeing a head-on collision of an automobile resulting in fatalities or injuries.

Insurance records show that the new so-called 5 MPH metal bumpers with hydraulic cylinders or springs to allow 3 inches to 6 inches movement upon impact, cost more to repair than the old style bumpers. My Back Motion Tire Buffer is designed to work in conjunction with the original equipment movable bumpers to add extra absorption and protection and reduce the expensive damage from collisions and therefore reduce high insurance premiums.

The standard pneumatic tire and pressed steel wheel are very rugged and will resist being compressed out of their round shape. In most serious accidents, where the vehicle body is compressed out of shape and the engine is torn from its mounts, the spare tire and wheel are not damaged nor are the wheels on the vehicle.

There is absorption material consisting of a layer of rubber and cord, a layer of compressed air, a pressed steel wheel, and another layer of rubber and cord. All these layers must be collapsed before the struck object can reach the main body or cab of the vehicle.

The advantages of this thickness of absorption materials are obvious in absorbing the energy of collision and decelerating the vehicle whereby fatalities, serious injuries and property damage are reduced by an estimated 50 percent. Tests have shown that a car equipped as described above can drive head on into a concrete wall at 30 miles per hour and no break the headlights.

It is an object of my invention to supply an absorption device which I have named the "Back Motion Tire Buffer." This device will absorb the energy of a collision to an extent far greater than is possible with pressed steel.

It is another object of my invention that the Back Motion Tire Buffer be best used in conjunction with the new bumper rails that have rearward movement by means of hydraulic cylinders or springs, etc., with a movement stroke of about 3 inches to 6 inches. It is not restricted to said type of bumper and can be used with any bumper device including rigid type bumper devices.

It is a further object of my invention to provide small, medium, and large automobiles, trucks, buses, and station wagons with the disclosed air bumper mounted as described.

It is a still further object of my invention to move the spare tire and wheel from the trunk of the vehicle or other storage space and to mount them on the vehicle in front and substantially vertical with the road surface.

It is another object of my invention to so mount the wheel on the front of the vehicle that it will be interposed between the vehicle and any barrier with which a collision may occur.

It is yet another object of my invention to provide the tire portion with a flexible removable cover to protect it from the elements.

It is a further object of my invention to weld or bolt the rear end of the longitudinal strut to the axle cross member of the car frame or other hard point and weld or bolt the sliding sleeve to the movable bumper rail on the car so as to provide a very rugged mounting for the spare tire and wheel thus diminishing it from bending, twisting or breaking loose from the movable bumper rail on the car frame upon hard impact.

It is a further object of my invention to show an alternate mounting frame for the vertical arm without the sliding sleeve and without the longitudinal strut but otherwise basically the same.

It is yet further object of my invention to use the vertical mounting of this Back Motion Tire Buffer on vehicles not best adapted to use of my previous inventions where the wheel and tire are held in a substantially horizontal position.

FIG. 1, Front view with Back Motion Tire Buffer installed on the front of the car.

Figure 2:
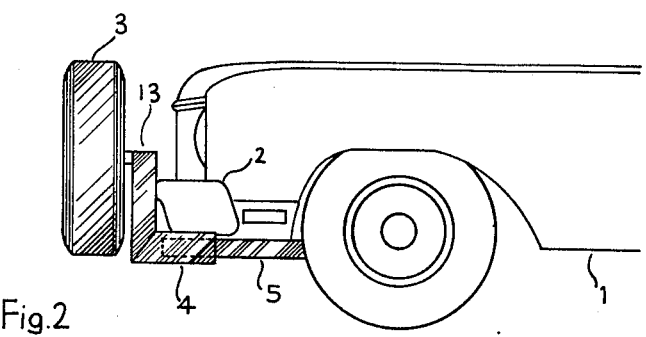

FIG. 2, Side view with Back Motion Tire Buffer installed on the front of the car.

Figure 3:
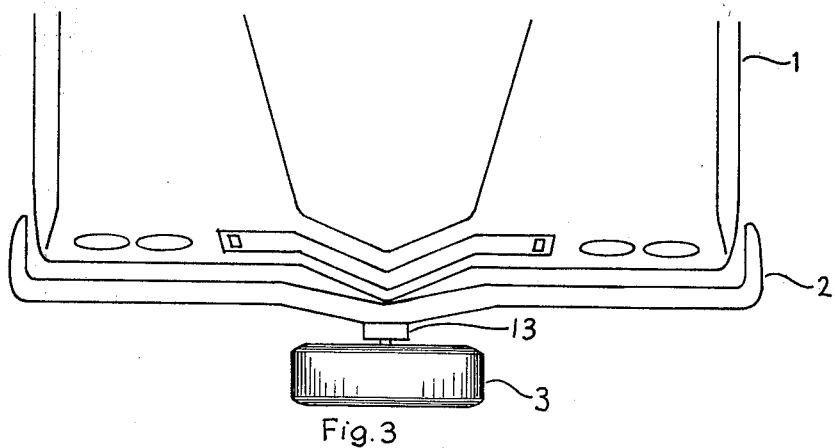

FIG. 3, Top view with the Back Motion Tire Buffer installed on the front of the car.

FIG. 4, Side view of Back Motion Tire Buffer frame not installed.

FIG. 5, Front view of Back Motion Tire Buffer frame not installed.

FIG. 6, Top view of Back Motion Tire Buffer frame not installed.

FIG. 7, View of parts to attach spare tire and wheel to vertical arm.

FIG. 8, Side view of Back Motion Tire Buffer showing sliding sleeve frame assembly with spare tire and wheel installed to frame, in the normal position and the back most compressed position.

FIG. 9, Side view, alternate mounting of Back Motion Tire Buffer without sliding sleeve and without longitudinal strut but otherwise basically the same showing the normal position and the back most compressed position.

No. 1 — Car
No. 2 — Movable bumper rail
No. 3 — Spare tire and wheel
No. 4 — Sliding sleeve cylinder
No. 5 — Longitudinal strut piston
No. 6 — Hub flange
No. 7 — King-pin
No. 8 — Hub washer
No. 9 — Wing nut
No. 10 — Lock
No. 11 — Spacer
No. 12 — Attaching flange for sliding sleeve piston
No. 13 — Vertical are element
No. 14 — Mounting bolts or weld
No. 15 — Alternate attaching flanges for vertical arm The Back Motion Tire Buffer utilizes the spare tire and wheel as an energy absorber, because the tire and wheel 3 are mounted in the front of the car 1 on the movable bumper rail 2 in a substantially vertical position, and it is held in said position by a vertical arm 13 attached to the front end of a sliding sleeve cylinder 4, said sleeve is secured to movable bumper 2 by attaching flange 12 on said sleeve 4 which slides over the front end of a longitudinal strut piston 5 which is fastened at its rear end by bolts or weld 14 to car frame axle cross member or other hard point on the car frame, and at the front top end of vertical arm 13, extending forward is a king-pin 7, a spacer 11, a hub flange 6, a hub washer 8, a wheel and tire 3, a wing nut 9, a lock 10, and this complete assembly is clamped together by wing nut 9, which all moves back against the stop in the cylinders on the vehicle to which it is installed without touching the body together with the bumper 2, upon collision into an obstruction at the front of car 1. There is provided alternate attaching flanges 15 especially shaped and formed to fit the bumper design to which the vertical arm 13 is to be secured to the movable bumper 2, thus eliminating the need of a sliding sleeve 4 and longitudinal strut 5.

Having thus described my invention, I claim:

1. In a motor vehicle, an energy absorbing backmotion tire buffer, comprising, in combination, a wheel mounted pneumatic tire postioned substantially vertical, with a circumference parallel to the lateral plane of the vehicle, forward of the vechicle movable bumper rail, so as to extend forward of other vehicle elements with the bottom of said tire and wheel being substantially level with the bottom of the vehicle bumper, and said tire and wheel being mounted on a carrier frame comprising a vertical arm element constructed and arranged at right angles to the longitudinal axis of the vehicle, at the top of said vertical arm element, a right angle attaching element facing forward from said vehicle for the purpose of attaching the hub of the wheel; at the bottom of said vertical arm element means for securing said vertical arm to the movable bumper of said vehicle comprising attaching flanges and a piston and a cylinder strut arrangement facing rearwardly of the vertical arm element or a longitudinal plane of the vehicle, having the rear of said piston strut secured to said vehicle axle frame and the front of said cylinder strut secured to said vertical arm element and bumper, so as to allow limited back motion of the tire, wheel, vertical arm, cylinder strut, and vehicle bumper, as a unit when being forced back against stops in the cylinders without touching or denting the vehicle body, when striking an obstruction in front of the exposed tire and wheel.

2. The invention as set forth in claim 1 wherein said carrier frame includes a longitudinal strut, piston and cylinder arrangement with a stop in the strut to limit back motion of said tire and wheel equal to the limited extent of motion provided by stops in the cylinders of the vehicle movable bumper.

3. The invention as set forth in claim 1 wherein the carrier frame includes a vertical arm element rigidly connected to the vehicle bumper and the longitudinal strut with means for limiting the back motion of the vehicle bumper, vertical arm element, cylinder end of the longitudinal strut, tire, and wheel as a unit upon collision along the longitudinal axis of the vehicle.

4. The invention as set forth in claim 3 wherein the vehicle arm element supports the tire and wheel at a height positioning and retaining the bottom of said tire substantially level with the vehicle bumper and substantially in an upright position away from the vehcile front end upon collision along the longitudinal axis of the vehicle.

5. The invention as set forth in claim 1 wherein means is provided for easy installation and removal of said tire and wheel comprising a ringping facing forward at right angles to said vertical arm element, a spacer hub flange, hub washer, wing nut and lock, and said tire and wheel being clamped in place at said wheel hub between said hub flange and said hub washer by means of said wing nut on the end of said ringpin.

6. The invention as set forth in claim 1 wherein a portion of said carrier frame is adapted to be mounted on the front or the rear extremity of said motor vehicle bumpers.

* * * * *